(12) United States Patent
Wolfram et al.

(10) Patent No.: US 9,582,648 B2
(45) Date of Patent: Feb. 28, 2017

(54) METHOD FOR USING A MULTI-FUNCTION COMPUTER FOR TESTING

(71) Applicant: WOLFRAM ALPHA LLC, Champaign, IL (US)

(72) Inventors: Stephen Wolfram, Concord, MA (US); Taliesin Sebastian Beynon, Somerville, MA (US); Robert Kerr Lockhart, Chicago, IL (US)

(73) Assignee: Wolfram Alpha LLC, Champaign, IL (US)

( * ) Notice: Subject to any disclaimer, the term of this patent is extended or adjusted under 35 U.S.C. 154(b) by 0 days.

(21) Appl. No.: 14/332,043

(22) Filed: Jul. 15, 2014

(65) Prior Publication Data

US 2014/0337990 A1 Nov. 13, 2014

Related U.S. Application Data

(62) Division of application No. 12/884,720, filed on Sep. 17, 2010, now Pat. No. 8,789,197.

(51) Int. Cl.

| | |
|---|---|
| *G06F 21/00* | (2013.01) |
| *G06F 7/544* | (2006.01) |
| *G09C 5/00* | (2006.01) |
| *G06F 21/62* | (2013.01) |
| *G06F 21/60* | (2013.01) |
| *H04L 9/32* | (2006.01) |
| *H04W 12/08* | (2009.01) |

(52) U.S. Cl.
CPC ............... *G06F 21/00* (2013.01); *G06F 7/544* (2013.01); *G06F 21/608* (2013.01); *G06F 21/629* (2013.01); *G09C 5/00* (2013.01); *H04L 9/3236* (2013.01); *H04W 12/08* (2013.01)

(58) Field of Classification Search
CPC ...... G06F 21/608; G06F 21/629; G06F 7/544; H04W 12/08; H04L 9/3236
USPC .......................................................... 726/26
See application file for complete search history.

(56) References Cited

U.S. PATENT DOCUMENTS

| | | |
|---|---|---|
| 2006/0242414 A1 | 10/2006 | Corson et al. |
| 2006/0277233 A1 | 12/2006 | Miller et al. |
| 2008/0112627 A1 | 5/2008 | Oda |
| 2009/0115606 A1 | 5/2009 | Rosenquist |
| 2009/0144838 A1 | 6/2009 | Rosenquist |

(Continued)

OTHER PUBLICATIONS

Stephen Wolfram, A New Kind of Science, Wolfram Research, Inc. (2002).

(Continued)

*Primary Examiner* — Hadi Armouche
*Assistant Examiner* — Angela Holmes

(57) ABSTRACT

A system and method facilitate the use of a multi-function computer for an examination. An application implementing the method receives a hash input from a user and, upon successful completion of the examination, displays a hash output. The hash output may be displayed as a visual hash. During the examination, the application or system monitors the multi-function computer to determine whether the user has activated, viewed, or launched any prohibited functions or applications on the multi-function computer. If the user views a prohibited function or application, the examination application does not display the hash output. The system and application implement various security measures to prevent spoofing or duplication of the hash output or tampering with the application.

18 Claims, 17 Drawing Sheets

(56) References Cited

U.S. PATENT DOCUMENTS

2009/0325566 A1 12/2009 Bell et al.

OTHER PUBLICATIONS

Texas Instruments, "Ti-nspire Press-to-Test," (2010) <URL:http://education.ti.com/sites/US/downloads/pdf/press_to_test_guide.pdf>.
Identicon, (2010) <URLhttp://en.wikipedia.org/w/index.php?title=Identicon&Oldid=367884328>.
You've Been Haacked and You Like It, "Identicons as Graphical Digital Fingerprints," (2007). Retrieved from the Internet on Jan. 11, 2011: URL: <http://haacked.com/archive/2007/01/22/Identicons_as_Visual_fingerprints.aspx>.
Digital Consumption, "Visiglyphs for IP visualisation," 2003-2011, <URL:http://digitalconsumption.com/forum/Visiglyphs-for-IP Visualisation>.
Bartolini, F.; et al.; "Image authentication techniques for surveillance applications," Proceedings of the IEEE vol. 89, Issue: 10, Digital Object Identifier: 10.1109/5.959338; Publication Year: 2001, pp. 1403-1418.
Shuihua Han; et al.; "Content-based Image Authentication: Current Status, Issues, and Challenges," Semantic Computing, 2007. ICSC 2007. International Conference on Digital Object Identifier: 10.1109/ICSC.2007.100; Publication Year: 2007, pp. 630-636.

METHOD FOR USING A MULTI-FUNCTION COMPUTER FOR TESTING

RELATED APPLICATIONS

This application is a divisional application of, and claims the benefit of priority of, U.S. patent application Ser. No. 12/884,720, now U.S. Pat. No. 8,789,197, filed on Sep. 17, 2010, entitled "Method for Using a Multi-Function Computer for Testing," the entire disclosure of which is incorporated by reference herein, in its entirety, for all purposes.

TECHNICAL FIELD

The present disclosure generally relates to a system and method for testing and, more particularly, to a method and system for using a multi-function computer for academic testing, by allowing a person to use during an academic examination one or more functions of the computer, and notifying a proctor at the completion of the examination whether the computer accessed any prohibited function (or data).

BACKGROUND

Calculators have long been a fixture in grade school mathematics classrooms. Calculators allow students in the classroom to learn and explore advanced mathematical concepts. Students that have mastered addition, subtraction, multiplication, and division, may employ four-function calculators, for example, to allow them to focus on more advanced concepts while avoiding laborious and tedious underlying arithmetic. Scientific calculators may provide more advanced mathematical computation to allow students to focus on still higher mathematical concepts.

With the advent of more-powerful, inexpensive microprocessors came the introduction of graphing calculators. In the intervening time, graphing calculators have become a fixture in high school mathematics courses. The increased processing power of these devices allows them to, among other things, solve complex mathematical equations, determine variable values, and graph complex functions. Many of these calculators can also execute user-created programs. Of course, doing so requires access to a basic editor, usually included in the calculator, and increased memory space, which may be used to store the additional information. Partially as a result of this ability to create, store, and access user-created content, the use of graphing calculators during examinations has been debated. In some circumstances, particularly those related to standardized examinations (e.g., the SAT Reasoning Test, the ACT test, etc.), use of graphing calculators is strictly regulated or even prohibited.

More recently, manufacturers of graphing calculators have implemented wireless communication (e.g., IEEE 802.11 protocols) to allow the calculators to communicate with other devices. While this new capability has practical and useful applications in the classroom setting, it further complicates the issue of using calculators during academic examinations.

Manufacturers of some graphing calculators have implemented software on the calculators that allows certain functions of the devices to be disabled when the device is placed into an examination mode. In addition to disabling selected functions and built-in capabilities of the graphing calculator, entering the examination mode typically prohibits access to any user-created content on the calculator, restoring the access to content when the device exits the examination mode. At least one family of graphing calculators requires connection of one device to another in order to exit the examination mode.

As more powerful processors have become available, manufacturers have integrated these processors into ever-smaller devices such as portable media players (PMPs) and "smart" phones. In addition to implementing its primary function (e.g., playing media, making phone calls, etc.), each of these devices may be programmed to execute additional functions, such as sending/receiving e-mail and text messages, word processing, calendar functions, browsing the World Wide Web, taking photographs, playing games, and any number of others. Typically, each function implemented on these portable, multi-function computers, is written as a separate application. Collectively, these applications are often referred to as "apps."

Currently, portable, multi-function computers cannot be used in the examination environment, especially in the realm of standardized examinations, because of the risk of cheating by, for example, using a multi-function computer to retrieve information from the Internet or accessing a prohibited function or application.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

DETAILED DESCRIPTION

Figure 1:
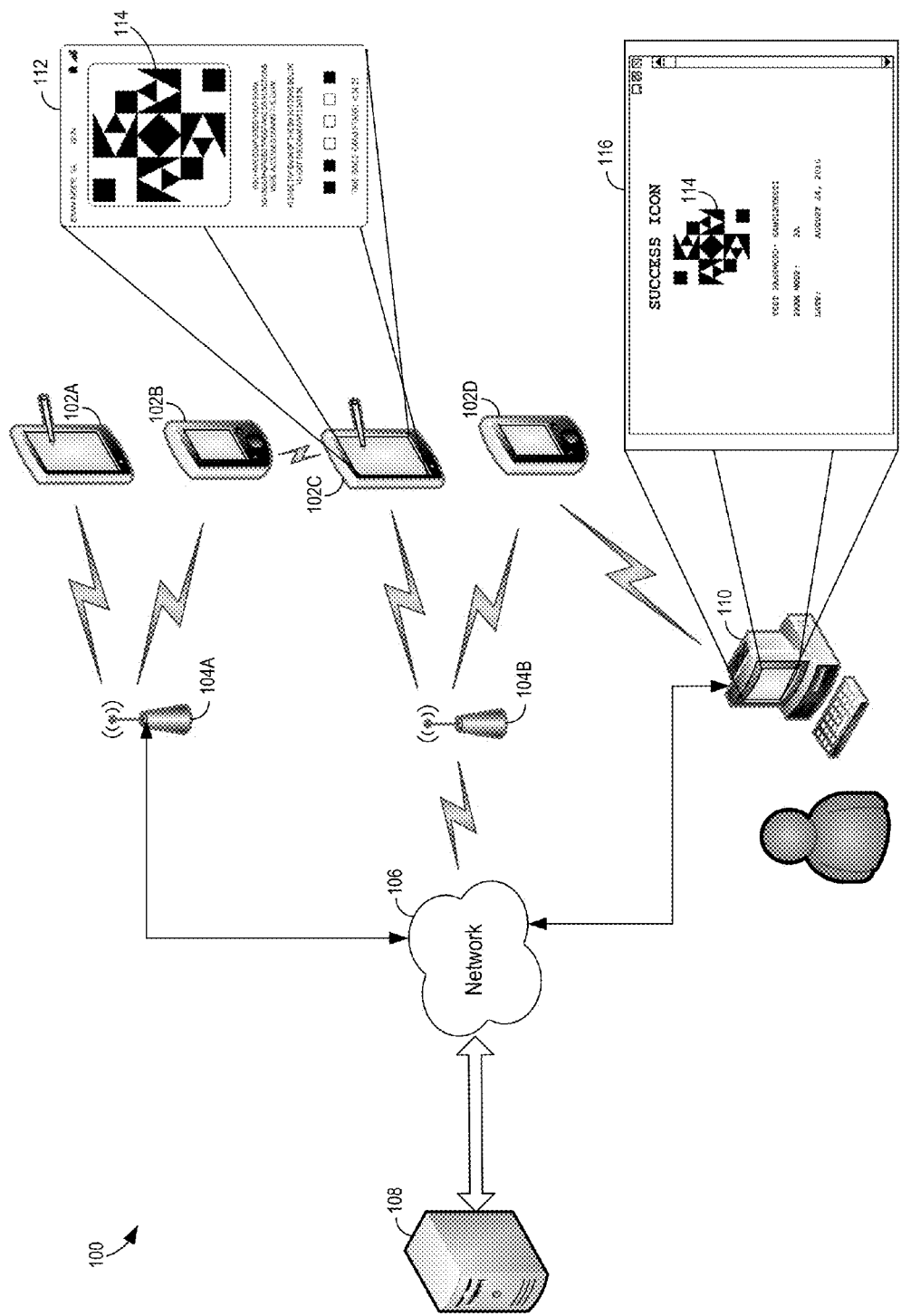
FIG. 1 illustrates an exemplary embodiment of a system implementing a multi-function computer for testing, in accordance with the presently described embodiments.

FIG. 1 depicts an embodiment of an exemplary system 100 for using a multi-function computer for testing. The system 100 includes a plurality of mobile, multi-function computers 102, which may include mobile phones, smart phones, tablet computers, portable computers (e.g., laptop and netbook computers), personal digital assistants (PDAs), portable media players (PMPs), and the like. Throughout this specification, the term "mobile device" will be used to refer to any of these mobile, multi-function computers 102. The mobile devices 102 are generally characterized by: a general purpose microprocessor (i.e., one that can be programmed to perform different functions at different times, according to the desires of the user); a memory device and/or system, storing an operating system and a plurality of applications; a display; and an input mechanism, such as a keyboard, a touch screen, etc.

In the embodiment depicted in FIG. 1, the system 100 also includes a plurality of wireless routers or access points 104, which may allow the mobile devices 102 to communicate with others of the mobile devices 102, with a digital network 106, with a server 108, and/or with a workstation 110. As FIG. 1 illustrates, communication may, in various embodiments, occur directly between devices, through a local area network (LAN), or through a wide area network (WAN). For example, the mobile devices 102B and 102C are illustrated as communicating directly with each other, the mobile device 102D is illustrated as communicating directly with the workstation 110, and each of the mobile devices 102 is illustrated as communicating with the digital network 106 through the wireless router or access points 104, which may be communicatively connected to the digital network 106 via a wireless or wired connection. Throughout this specification, it is contemplated that in these various embodiments, communication may (but need not necessarily) occur between any and all of the mobile devices 102, the wireless access points 104, the digital network 106, the server 108, and/or the workstation 110.

The digital network 106 may be a proprietary network, a secure public Internet, a virtual private network or some other type of network, such as dedicated access lines, plain ordinary telephone lines, satellite links, combinations of these, etc. Where the digital network 106 comprises the Internet, data communication may take place over the digital network 106 via an Internet communication protocol.

As described in the following paragraphs, the system 100 includes at least an application executable on the mobile devices 102. The application, when executed by the mobile device 102, allows the user to place the application in an examination mode. While in the examination mode, certain functions may be accessible, while others may not be accessible. Additionally, the application may monitor whether the user exits the application (or opens other applications). When the user exits the examination mode, the application may cause the mobile device 102 to display a screen 112 indicating that the user has completed the examination without accessing any unauthorized functions and/or applications or, alternatively, a screen indicating that the user accessed unauthorized functions and/or applications during the course of the examination. The indication may be a code or icon 114, such that the user cannot predict and/or duplicate the indication. The code or icon 114 may be the same for multiple (or all) users taking the examination, or may be different for each user or different for each of several classes of users. In some embodiments, a screen 116 on the display of the workstation 110, may display the code or icon 114 for an individual user, for a class of users, or for all of the users, to allow an examination proctor to verify the code or image 114 displayed on the mobile device 102.

Figure 2:
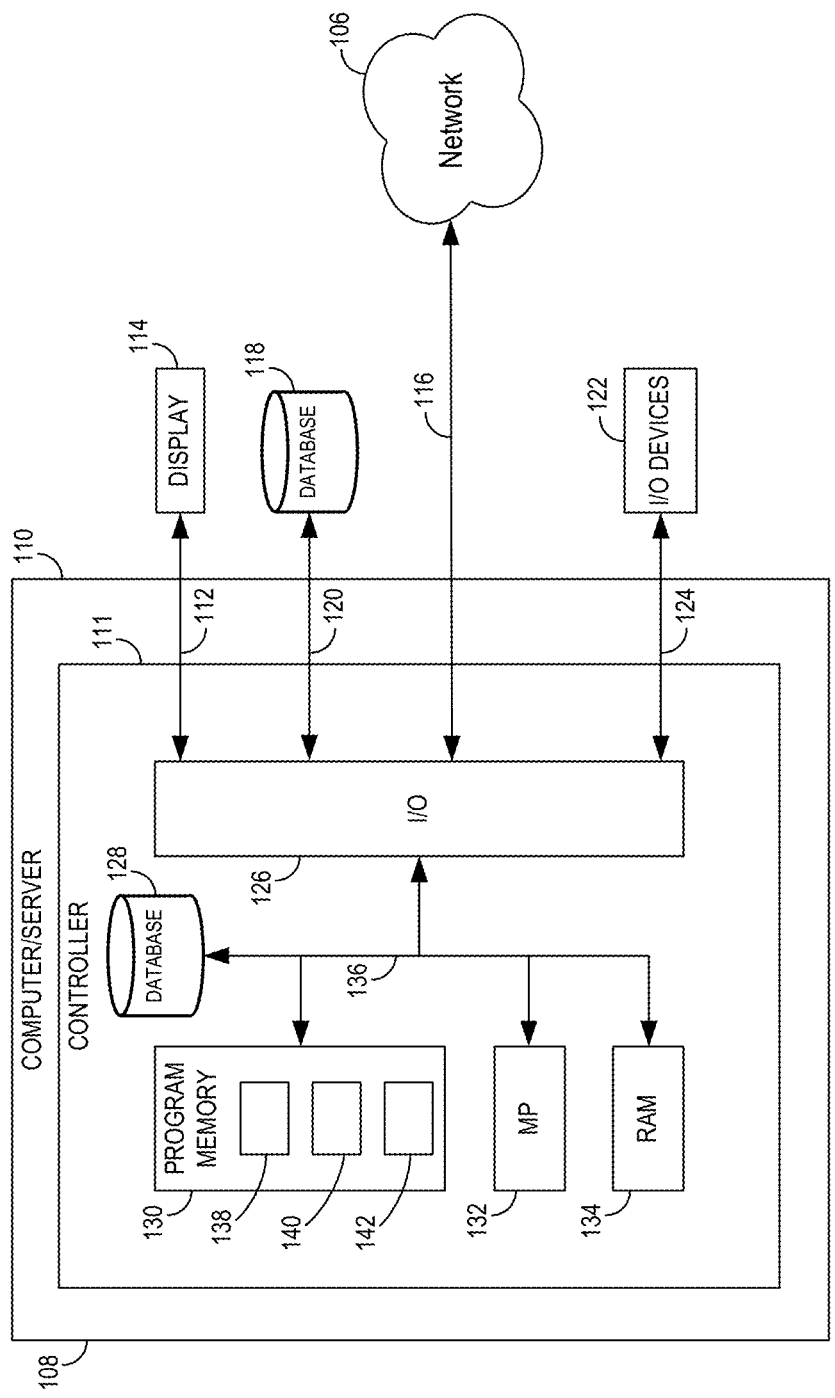
FIG. 2 depicts a block diagram of an embodiment of a server or a workstation that may operate in the system of FIG. 1.

FIG. 2 depicts a block diagram of one possible embodiment of the server 108 or the workstation 110. The server 108 or the workstation 110 may have a controller 111 communicatively connected by a video link 112 to a display 114, by a network link 116 (i.e., an Ethernet or other network protocol) to the digital network 106, to a database 118 via a link 120, and to various other I/O devices 122 (e.g., keyboards, scanners, printers, etc.) by appropriate links 124. The links 112, 116, 120, and links 124 are each coupled to the server 108 via an input/output (I/O) circuit 126 on the controller 111. It should be noted that additional databases, such as a database 128 in the server 108 or other databases (not shown) may also be linked to the controller 111 in a known manner.

The controller 111 includes a program memory 130, a processor 132 (may be called a microcontroller or a microprocessor), a random-access memory (RAM) 134, and the input/output (I/O) circuit 126, all of which are interconnected via an address/data bus 136. It should be appreciated that although only one microprocessor 132 is shown, the controller 111 may include multiple microprocessors 132. Similarly, the memory of the controller 111 may include multiple RAMs 134 and multiple program memories 130. Although the I/O circuit 126 is shown as a single block, it should be appreciated that the I/O circuit 126 may include a number of different types of I/O circuits. The RAM(s) 134 and the program memories 130 may be implemented as semiconductor memories, magnetically readable memories, and/or optically readable memories, for example.

Figure 3:
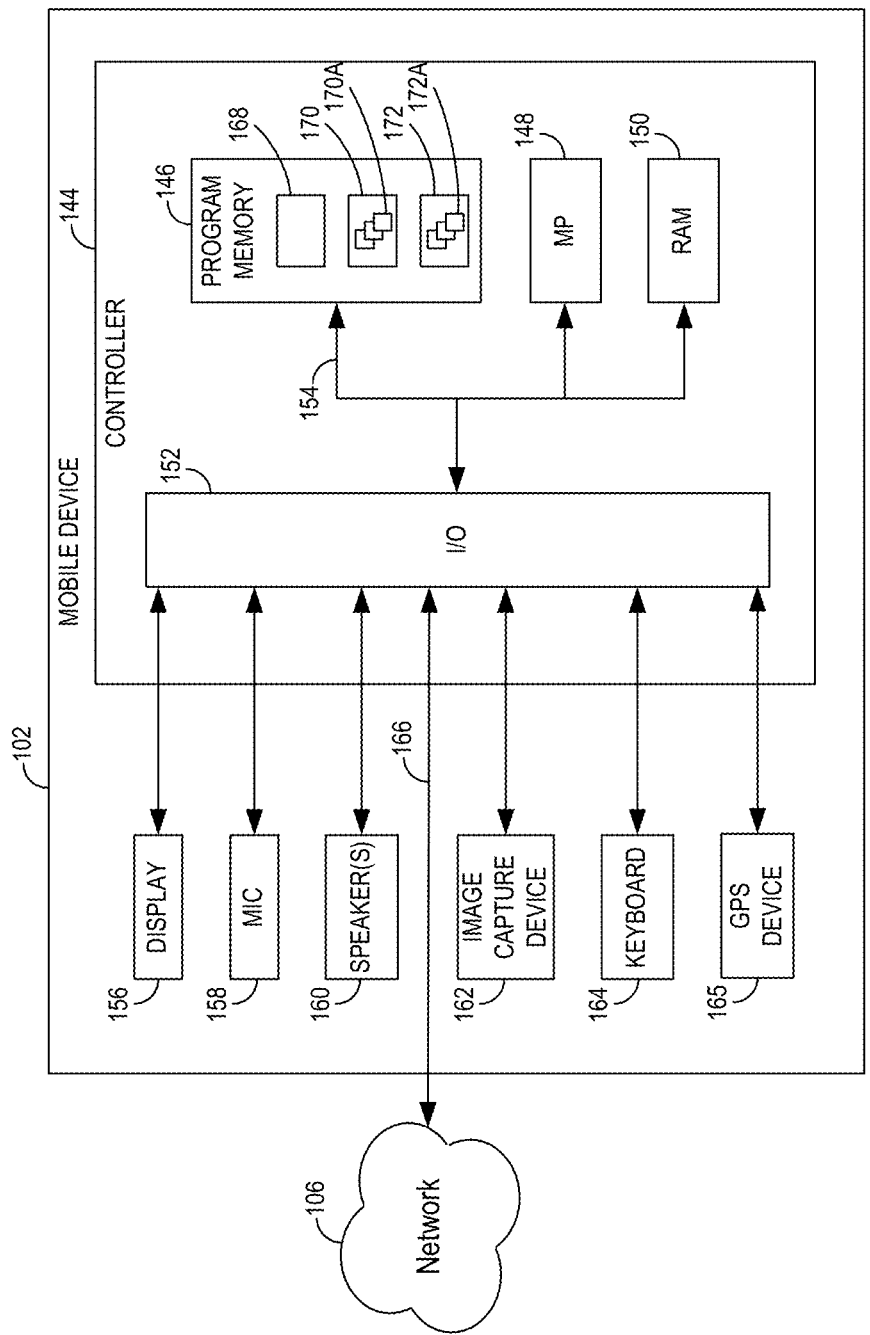
FIG. 3 depicts a block diagram of a mobile device that may operate in the system of FIG. 1.

A block diagram of an exemplary embodiment of one of the mobile devices 102 is depicted in FIG. 3. Like the server 108 and workstation 110, the mobile device 102 includes a controller 144. The controller 144 includes a program memory 146, a processor 148 (may be called a microcontroller or a microprocessor), a random-access memory (RAM) 150, and an input/output (I/O) circuit 152, all of which are interconnected via an address/data bus 154. It should be appreciated that although only one microprocessor 148 is shown, the controller 144 may include multiple microprocessors 148. Similarly, the memory of the controller 144 may include multiple RAMs 150 and multiple program memories 146. Although the I/O circuit 152 is shown as a single block, it should be appreciated that the I/O circuit 152 may include a number of different types of I/O circuits. The RAM(s) 150 and the program memories 146 may be implemented as semiconductor memories, magnetically readable memories, and/or optically readable memories, for example.

The I/O circuit 152 may communicatively connect the other devices on the controller 144 to one or more other hardware in the mobile device 102. For example, the mobile device 102 includes an integrated display 156, which may be a touch sensitive display, a microphone 158, one or more speakers 160, an image capture device 162, a keyboard 164, and/or a geolocation device 165 (e.g., a global positioning system (GPS) receiver). If included, each of the microphone 158, the speakers 160, the image capture device 162, the keyboard 164, and the geolocation device 165 may be integrated in the mobile device 102 (e.g., in a mobile phone or a tablet computer), or may be a peripheral component. Additionally, the various components in the mobile device 102 may be integrated on a single printed circuit board (PCB) (not shown) and/or may be mounted within a single housing (not shown).

The I/O circuit 152 may also communicatively connect the controller 144 to the digital network 106, via a connection 166, which may be wireless (e.g., IEEE 802.11) or wireline (e.g., Ethernet) connections. In some embodiments, a chipset on or attached to the I/O circuit 152 may implement communication between the controller 144 and the digital network 106, while in other embodiments, an Ethernet device (not shown) and/or wireless network card (not shown) may comprise separate devices connected to the I/O circuit 152 via the address/data bus 154.

Either or both of the program memories 130 (FIG. 2) and 146 (FIG. 3) may contain machine-readable instructions (i.e., software) 138-142 (FIG. 2) and 168-172 (FIG. 3) for execution within the processors 132 (FIG. 2) and 148 (FIG. 3), respectively. The software 138-142 and 168-172 may perform the various tasks associated with operation of the server 108 and the mobile device 102, respectively, and may be a single module or a plurality of modules. While the software 138-142 and 168-172 is depicted in FIGS. 2 and 3 as including three modules each, the software 138-142 and 168-172 may include any number of modules accomplishing tasks related to operation of the system 100. For example, the software 138-142 depicted in FIG. 2 includes an operating system 138, server applications 140, and other program applications 142, each of which may be loaded into the RAM 134 and/or executed by the microprocessor 132. Similarly, the software 168-172 includes an operating system 168, one or more applications 170 and, specifically, an examination application 172. Each of the applications 170 may include one or more routines or modules 170A. Likewise, the examination application 172 may include one or more modules or routines 172A.

This specification refers throughout to the examination application 172. However, the examination application 172 may have purposes other than, and be used in settings other than, examination. For example, the examination application 172 could be used in a classroom setting in which an examination is not currently taking place, or for routine calculations in the course of homework. Accordingly, while users of the examination application 172 are referred to throughout the specification as examinees, the user may also be a student or any other person having reason to use the examination application 172. Additionally, while the specification refers to a proctor throughout, the proctor could just as easily be any teacher, professor, test administrator, teacher's assistant, etc.

Figure 4:
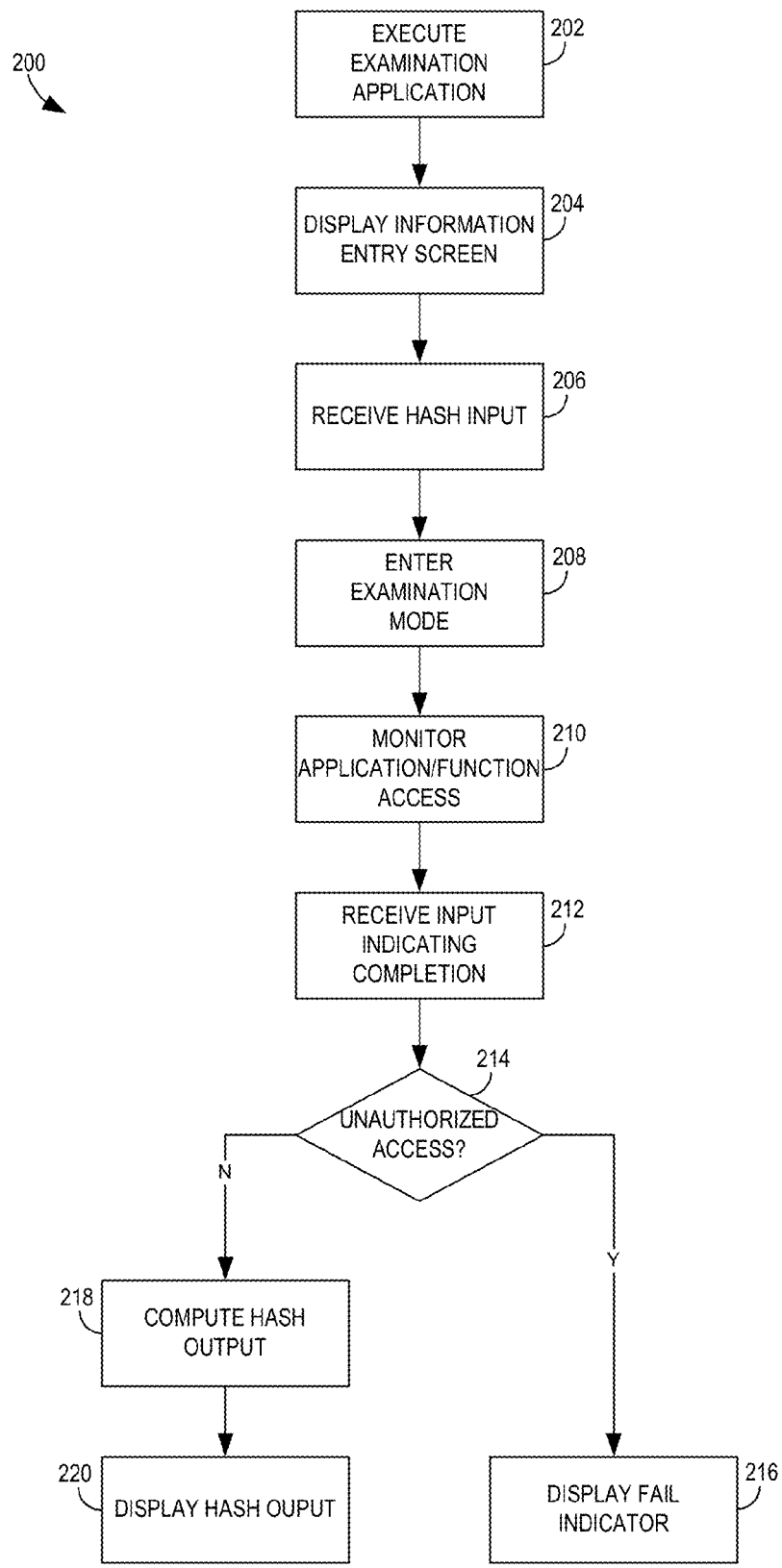
FIG. 4 depicts an exemplary method of using a multi-function computer for testing in accordance with the presently described embodiments.

While there are many possible embodiments of the method described herein, FIG. 4 depicts an exemplary embodiment of a method 200 for using a multi-function computer for testing. To initiate the method 200, a user executes the examination application 172 stored on the program memory 146 (block 202). This may cause the microprocessor 148 to begin copying instructions from the program memory 146 to the RAM 150 as well as parsing and executing the instructions. During this process, the display 156 may present a splash screen (i.e., an image to indicate that the program is loading) and/or a welcome screen. Additionally, the examination application 172 may execute a number of self-tests, operating system checks, and application checks, to verify that the operating system, the examination application 172, and other applications have not been tampered with, modified, or disabled.

It is worth noting at this point that while FIG. 3 depicts the examination application 172 as stored on the program memory 146 of the mobile device 102, the application 172 could also be stored on a remote device, such as the server 108, and accessed through a web browser stored among the applications 170 in the program memory 146 of the mobile device 102. In still other embodiments, a shortcut application (not shown) may be stored among the applications 170, which may cause the mobile device to execute the web browser and/or download and execute the application 172 from the server 108.

In any event, after execution of the examination application 172 (block 202), the microprocessor 148 causes the display 156 to present an information entry screen (block 204). It is via the information entry screen that a user may enter information about the exam, about the configuration of the examination application 172, and even about the user. The information requested and/or entered may include any desirable or useful information for a given situation, however, it is explicitly contemplated that the information requested includes one or more of the following: a name; a personal identification number; an examinee registration number; an examination booklet number; an examination code (indicating the type or identity of the examination); a password; an allotted examination time; a capability code (e.g., indicating the allowed functionality of a calculator).

Figure 5A:
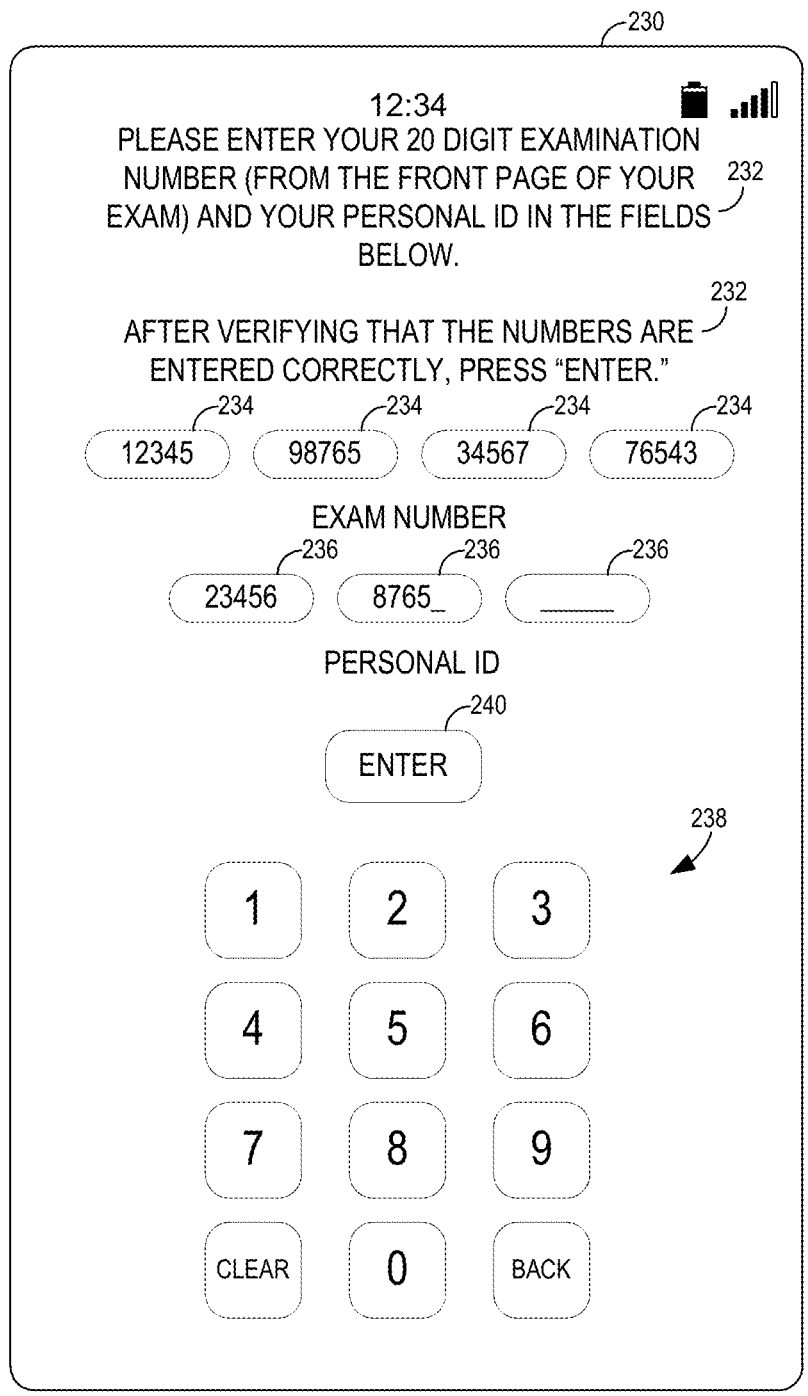
FIG. 5A illustrates a first embodiment of an information entry screen that may be implemented on the mobile device of FIG. 3.

FIG. 5A depicts an exemplary information entry screen 230 that may be presented to a user. The information entry screen 230 may include instructions 232, one or more fields 234, 236 for entering data, a numeric keypad 238 or alphanumeric keyboard (not shown), and a control 240 (in the form of a button or a softkey for example) for submitting the entered data. The information entry screen 230 may also include one or more levels of drop-down selection boxes.

The user may enter data into the fields 234, 236 using the numeric keypad 238. While in the embodiment depicted in FIG. 5A the information entry screen 230 is depicted as presented on a touch-sensitive display, it should be readily apparent that the various elements on the information entry screen 230 may also be arranged to accommodate non-touch sensitive displays and, additionally or alternatively, more traditional methods of data entry such as a physical keyboard on the mobile device 102, an external keyboard (not shown), a trackball or other pointing device (not shown), programmable "softkeys" (not shown), etc.

The instructions 232 in the illustrated information entry screen 230 direct the user to enter an examination number (i.e., a number specific to the examination in front of them) and a personal ID number (i.e., a number specific to the user). Of course, the information entry screen 230 may request more, less, and/or different information from the user, depending on the implementation of the examination application 172. Thus, the information entry screen 230 depicted in FIG. 5A may correspond to an embodiment of the application 172 for use in a standardized testing environment where, for example, there may be a variety of test booklets (e.g., having different question orders and/or different questions) and each examinee's test booklet has a number corresponding to the exact test booklet or to the format of the examination within the test booklet.

Figure 5B:
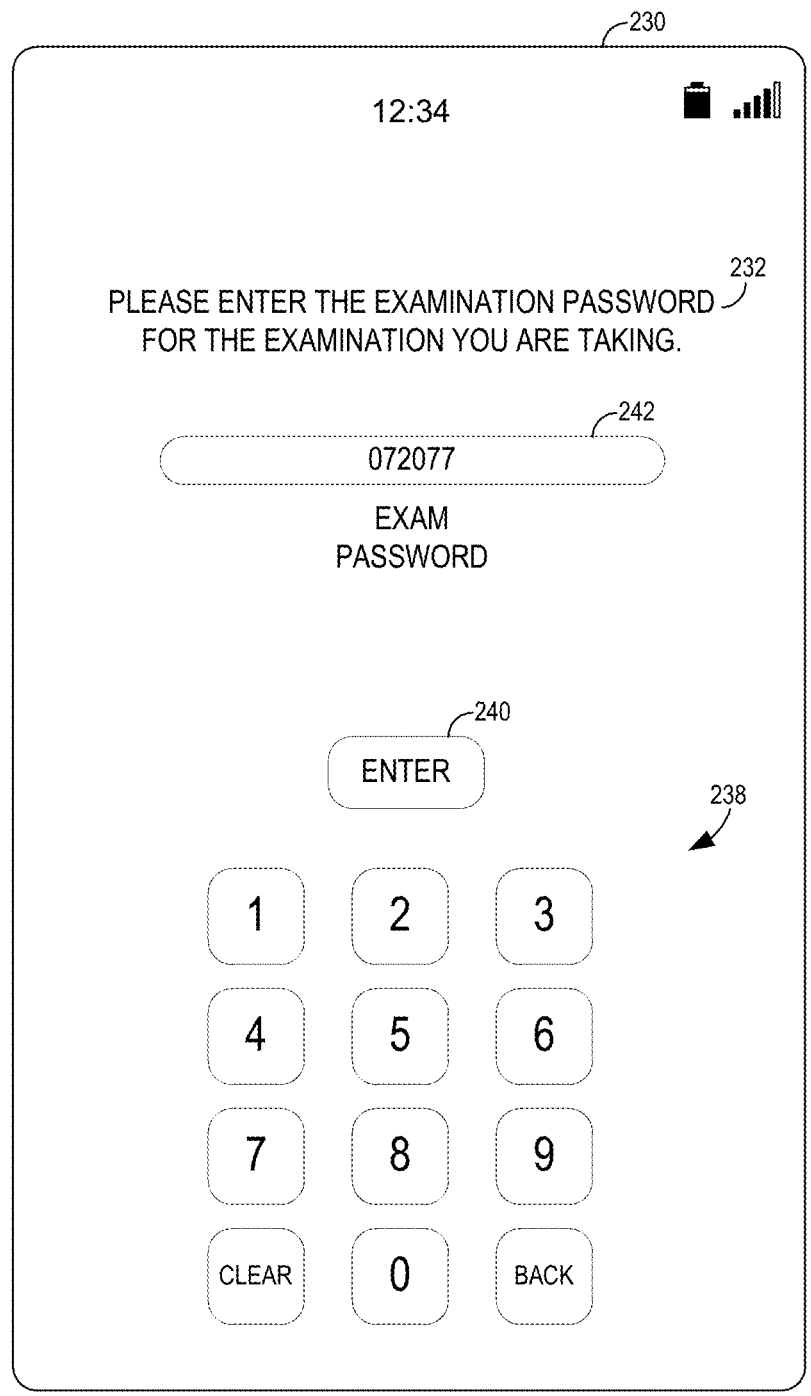
FIG. 5B illustrates a second embodiment of an information entry screen that may be implemented on the mobile device of FIG. 3.

Other embodiments of the examination application 172 may ask the user to enter different information via the information entry screen 230. In some embodiments, such as the embodiment depicted in FIG. 5B, the information entry screen 230 may provide instructions 232 requesting the user to input into a field 242 only an examination password. The examination password entered into the field 242 may be used as a hash input (as described below). Alternately or additionally, in embodiments in which the mobile device 102 is connected to the workstation 110 and/or the server 108, the examination password may cause the mobile device 102 to download from the workstation 110 and/or the server 108 information regarding the examination. The downloaded information may include: a name; a personal identification number; an examinee registration number; an examination booklet number; an examination code (indicating the type or identity of the examination); a password; an allotted examination time; a capability code (e.g., indicating the allowed functionality of a calculator); a test type; a test level; other indications of functions or features of the mobile device 102 and/or the examination application 170 to be enabled and/or disabled; and any other data as appropriate.

In still other embodiments in which the mobile device 102 is connected to the workstation 110 and/or the server 108, entry of the examination password may cause the mobile device 102 to register with the server 108 or the workstation 110, so that an application on the server 108 and/or the workstation 110 may track the status of the examination application 172 running on the mobile device 102. Registration may therefore include transmitting data to the workstation 110 and/or server 108 including: the information entered into the field 242 (or the fields 234, 236); information specific to the examination application 172 instance (e.g., an application registration number); and/or information specific to the mobile device 102 (e.g., a hardware serial number, a telephone number or electronic serial number, a media access control (MAC) address, or some combination or representation thereof, etc.); and/or information indicative of the current location of the mobile device 102.

In some embodiments, the examination application 172 may implement instructions to allow a user to use the image capture device 162 (if such a device is included in the mobile device 102) to scan a barcode, QR code, or other image as a means of inputting information into the examination application 172. For example, a barcode may be located on an examination registration sheet or sign-in sheet, on a test booklet, on a monitor or display, etc. An examinee may scan a barcode encoding any information desired or necessary to be input into the examination application 172, including the test type, the test level, the indication of functions or features of the mobile device 102 and/or the examination application 170 to be enabled and/or disabled, a student identification number, an examination booklet number, etc.

Figure 6:
FIG. 6 illustrates a barcode scanning screen that may be implemented on the mobile device of FIG. 3.
Figure 7:
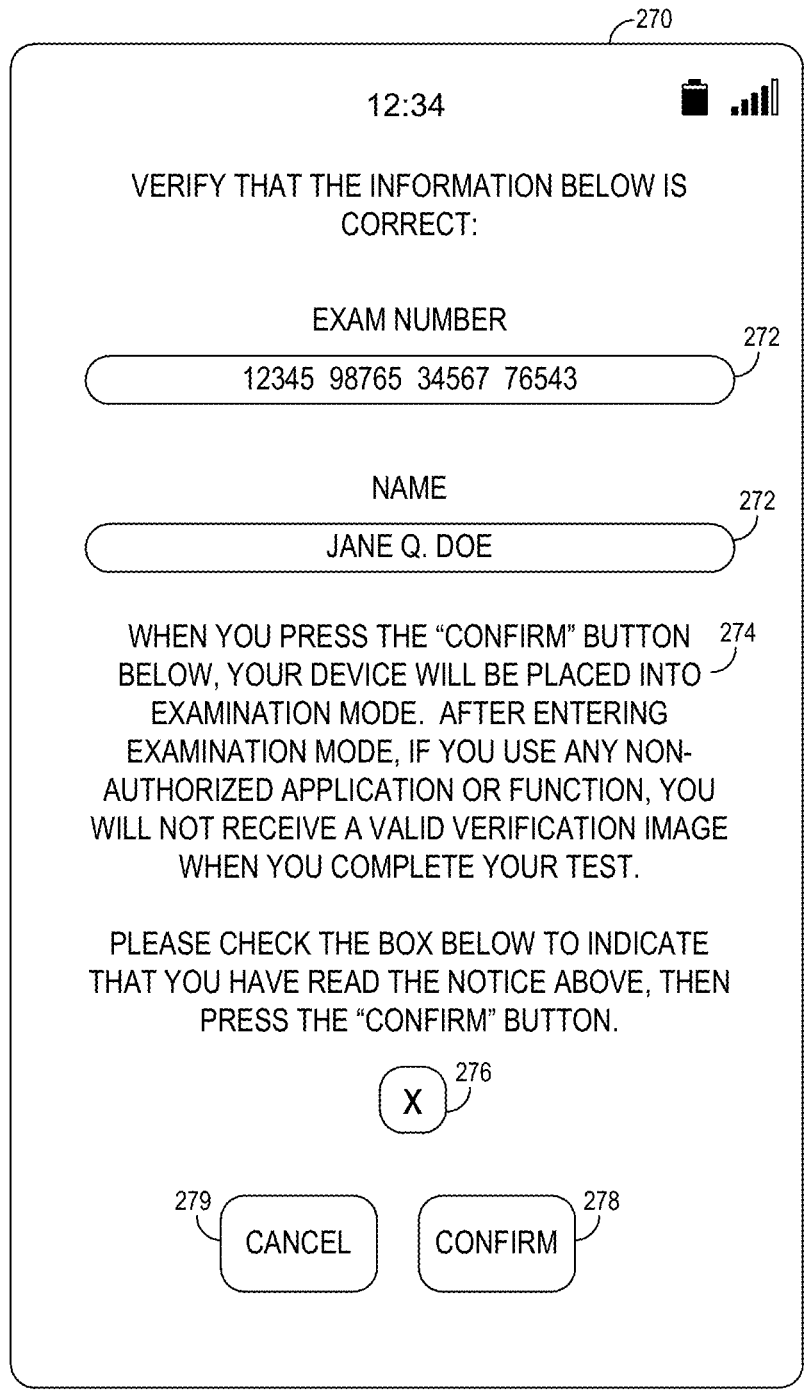
FIG. 7 illustrates an information verification screen that may be implemented on the mobile device of FIG. 3.

FIG. 6 depicts an exemplary barcode scanning screen 250 that may be implemented in the examination application 172. The barcode scanning screen 250 may be automatically presented on the display 156 of the mobile device 102 when the examinee enters the examination application 172, or may be presented upon selection and/or activation of a corresponding control, for example in the welcome screen of the examination application 172. Presentation of the barcode scanning screen 250 may cause (or may be contemporaneous with) activation of the image capture device 162.

The barcode scanning screen 250 may include an image display area 252 presenting the image sensed by the image capture device 162. The image display area 252 may have superimposed on it maximum barcode size indicator 254 and a minimum barcode size indicator 256. The barcode size indicators 254, 256 may serve to indicate to the examinee or other user the approximate size and location of that a barcode 258 of interest should occupy within the image display area 252. In addition to instructions 262, the barcode scanning screen 250 may also include a "capture" control 260, the activation of which causes the examination application 172 to capture, and optionally store, the barcode image.

In some embodiments of the examination application 172, a barcode interpretation routine, which may be either part of or independent of the examination application 172, interprets the barcode image to decode information contained therein. In other embodiments, in which the mobile device 102 is communicatively coupled to the server 108, the network 106, and/or the workstation 110, the examination application 172 may transmit the captured barcode image to another device or system, which may decode the information contained in the barcode 258 and transmit back to the examination application 172 the decoded information.

It is also the case that in some embodiments, the capture control 260 may be omitted and, instead, the examination application 172, the barcode image interpretation routine, or a combination of both may automatically detect, capture and/or interpret the barcode image when the image is within the detection limits indicated by the size indicators 254, 256.

In any event, once the examination application 172 has received the input information, either via the scanned barcode 258 or via the input information screen 230, the examination application 172, in some embodiments, may present an information verification screen 270 to allow the user to review the information entered and/or received from the server 108 or the workstation 110. The information verification screen 270 may instruct the user to verify the information entered (or decoded from the barcode 258), presenting the data in one or more fields 272 on the display 156 so that the examinee may check it against one or more documents from which the information was taken. The information verification screen 270 may also include an admonition 274 that the examination application 172 will enter examination mode when the user confirms that the information is correct. The information verification screen 270 may include a check box 276 to prevent the examinee from accidentally activating a control 278 that confirms the information is correct. The extra step may prevent the user from, as the result of habit perhaps, activating the control 278 without reading the instructions and confirming the information. Additionally, a "cancel" control 279 may allow the examinee to go back to a previous screen if the information on the information verification screen 270 is incorrect.

Some or all of the data entered via the information entry screen 230 and/or the barcode scanning screen may serve as a hash input for the examination application 172. The hash input serves as an input to a hash function, which is used to generate and output a hash value (a hash output). The hash function may be specified by the input information, or by the server 108 or the workstation 110, or may be hard-coded into the examination application 172. The hash value may serve as the indication presented upon successful completion of the examination (i.e., completion without accessing any prohibited functions or applications) and, in some embodiments, may be presented as a visual representation of the hash value. Examples of visual representations of hash values include identicons and visiglyphs, each of which is a specific implementation of such a visual representation. For simplicity, a visual representation of a hash value will be referred to in this specification as a "visual hash" or, where it indicates successful completion of an exam, a "success icon." The terms "visual hash" and "success icon" should therefore be viewed as interchangeable in the context of this specification. Further, while the following description makes reference to visual hashes as the indication of successful examination completion, the specification contemplates that the indication presented upon successful completion of the examination need not necessarily be a visual hash. For example, the hash code from which the visual hash is generated may be presented instead of, or in addition to, the visual hash. In one embodiment, a visual hash is generated using a cellular automaton or automata such as described in Stephen Wolfram, *A New Kind of Science*, Wolfram Research, Inc., 2002.

The purpose of the hash input, which the examinee, in some embodiments, enters upon execution of the examination application 172, is to allow the examination application 172 to generate the visual hash such that the examinee cannot predict the hash output to forge the visual hash. Specifically, the examinee should not know in advance the information that will be used as a hash input. For example, in embodiments in which the information entered via the information entry screen 230 comprises a password, the password is presumably provided just prior to the start of the examination. In embodiments such as those described with reference to FIG. 5 (e.g., using an examination number), the examination number may not be known prior to the examination.

The hash input may be specific to each examinee in some embodiments, while in others embodiments the hash input may be shared among all or a portion of the examinees. For example, a hash input may include all or a portion of an examinee identification number unique to each examinee, or may include only a simple password entered by all of the examinees. In still other embodiments, some portion of the hash input may be shared among examinees, while other portions of the hash input may be unique to each examinee, as would be the case, for example, where the hash input consists of a test booklet number that is either unique or, at least, one of several available.

Figure 8:
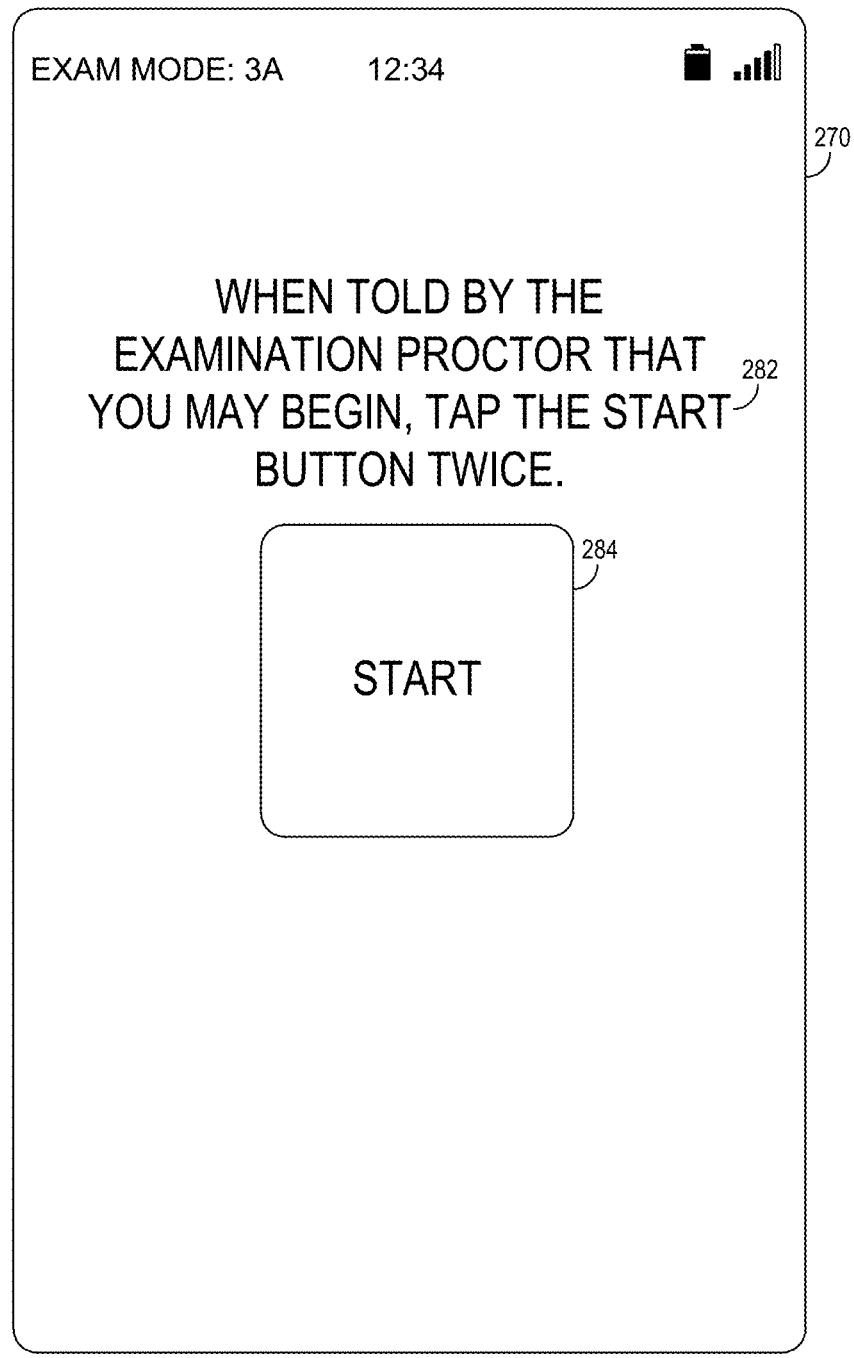
FIG. 8 illustrates a staging screen that may be implemented on the mobile device of FIG. 3.

Referring again to FIG. 4, after the examinee enters (and possibly confirms) the input information, the examination application 172 receives the hash input (block 206) and enters an examination mode (block 208). In some embodiments, the examination application 172 may present a staging screen prior to entering the examination mode. FIG. 8 depicts a possible embodiment of a staging screen 280 including simple instructions 282 and a start control 284. By way of example, the purpose of the staging screen 280 may be to more accurately control the entrance of the examination application 172 into the examination mode, so that the examination application 172 may track the start and end times of the examination or may track the total time between the start and end times of the examination. Various methods may be envisioned that prevent the examinee from entering the examination mode prematurely or accidentally. For example, the instructions 282 on the staging screen 280 direct the examinee to tap the start control 284 twice when the examination begins. The staging screen 280 could also include a verification image, which could be a visual hash, to allow a teacher or proctor to visually confirm that all examinees have entered the examination mode correctly. The staging screen 280 may also include a staging image (not shown) that the examinees may present to the proctor to verify that each mobile device 102 is configured correctly for the examination in question. The staging image may be a function of the hash input and, in particular, may be a visual hash.

Figure 9A:
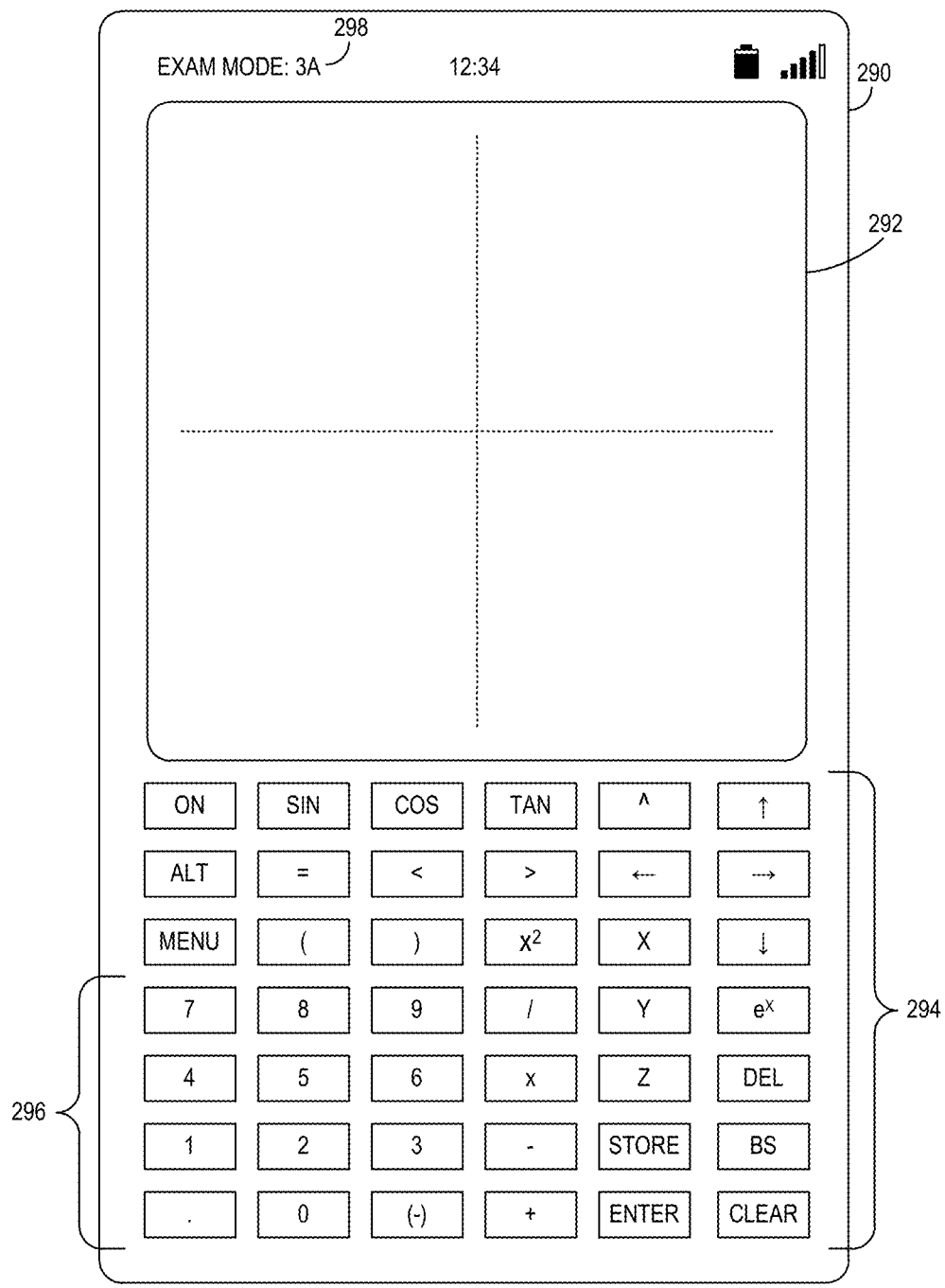
FIG. 9A illustrates a screen displaying a graphing calculator in accordance with presently described embodiments.

While in examination mode, the examination application 172 may provide specific and, in some embodiments selectable, functionality. For example, the examination application may provide a four-function calculator, a scientific calculator, and/or a graphing calculator. In some embodiments, one or more of the calculators and/or specific functions of one or more of the calculators, may be selectively enabled or disabled by information entered into the information entry screen 230. This allows the examinee to use the examination application 172 just as the examinee would use a separate four function, scientific, or graphing calculator, but to do so within the context of the examination application 172. As just one example, the examination application 172 may function as a graphing calculator. FIG. 9A depicts a screen 290 presented by the examination application 172 while the application is in examination mode. The graphing calculator function may provide a graphing window 292 which may graph functions and/or provide alphanumeric feedback to the examinee. The screen 290 may also include a collection of input controls 294, including a numeric keypad 296. Each of the input controls 294 can be programmed to have multiple functions and, on touch-screen devices, the input controls 294 may change depending on the order in which the keys are pressed, the calculator functions currently being executed, the current examination mode, etc. The screen 290 may also include an indication 298 that the examination application 172 is functioning in examination mode. Lastly, the screen 290 may include an indication (not shown) of the time since the examination started, the time remaining in the examination period, the start and completion times for the examinee, and/or the start time of the examination and the current time.

While in examination mode, the examination application 172 may also monitor the mobile device 102 (FIG. 4, block 210) and detect if the examinee launches or switches focus to a different application (e.g., monitors for a context switch). The examination application 172 may detect application launches and/or changes of application focus in various ways, depending on the device on which the application is implemented. For example, in some operating systems a signal is generated in a mobile digital device when an application is taken out of the foreground. For example, the signal may be from the operating system to the application, and may be followed by a brief (e.g., 50 ms) delay so that the application can store necessary data before becoming inactive or leaving the foreground or before closing. The examination application 172 may monitor for this signal to detect if the examinee switches focus to another application or closes the examination application 172 (e.g., the examination application 172 monitors for a context switch signal from the operating system). If the examination application 172 detects the signal, the examination application 172 will not display the visual hash upon completion of the examination, alerting the teacher or proctor that the student switched applications during the examination As described above, in some embodiments, the mobile device 102 may be operable to communicate wirelessly with a computer or server 108, either directly or through the network 106. In such embodiments, it is contemplated that the examination application 172 may register with the workstation 110 or the server 108, and may periodically send a "heartbeat" signal while the examination application 172 is in the foreground (i.e., is the active application on the mobile device 102). By receiving and tracking the "heartbeat" signal, the workstation 110 or the server 108 may monitor the status of the examination application 172. If the examination application 172 leaves the foreground—that is, if the examinee launches or views a different application—the heartbeat signal would stop transmitting, and the workstation 110 or server 108 would know that the examinee had viewed another application. Additionally or alternatively, the application 172 may transmit an indication to the server 108 or the workstation 110 if the examinee launches or views a different application.

The server 108 and/or the workstation 110 may also receive information, transmitted from the mobile device 102, indicating the location of the mobile device 102 (determined using the geolocation device 165) within a pre-determined accuracy. The location of the mobile device 102 may be monitored while the examination application is in examination mode, or may be checked and/or reported at specific times (e.g., when the examination application 172 enters or exits examination mode). The location of the mobile device 102 may be logged in some embodiments. Additionally or alternatively, the location of the mobile device 102 may be compared to a location designated in one or more records on the server 108 or the workstation 110, such as a record associated with a particular examination. Further, the location of the mobile device 102 may be used by the examination application 172 as part of the hash input value, which may allow a hash output (and a corresponding visual hash) to correspond to a particular location (again, within a pre-determined accuracy).

Figure 9B:
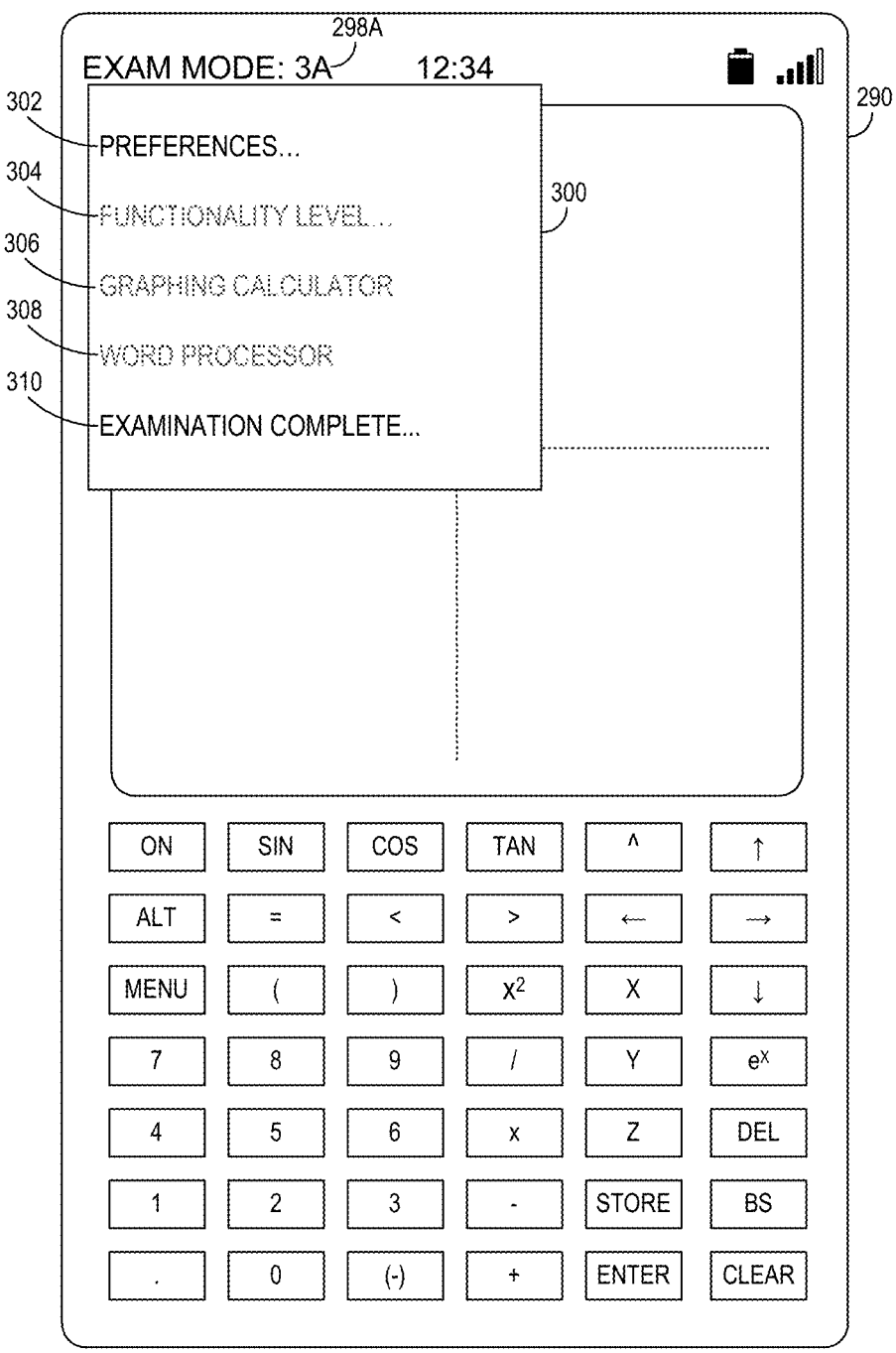
FIG. 9B illustrates a menu that may be displayed on the screen of FIG. 9A.

The examination application 172 provides a means of indicating examination completion (FIG. 4, block 212). While there are many possible ways that such a means of exit could be provided, in some embodiments, the examinee may access a menu by, for example and with reference to FIG. 9B, activating a control 298A co-located with the indication 298. Activating (e.g., tapping on, pressing, etc.) the control 298A on the screen 290 may provide a drop down menu 300. The drop down menu 300 may provide a variety of controls. The exemplary menu 300 depicted in FIG. 9B illustrates a "preferences . . . " control 302, a "functionality level . . . " control 304, a "graphing calculator" control 306, a "word processor" control 308, and an "examination complete . . . " control 310. Some or all of the controls 302-310 may be selectively enabled or disabled according to whether the examination application is in examination mode and/or what options are set for the particular examination (e.g., examination level, etc.). For instance, in the embodiment depicted in FIG. 9B, the controls 304, 306, 308 are disabled, which may be the case where the word processor function is unavailable in the current examination mode and the examination is already executing the graphing calculator function. Of course, the control 310 may be implemented in any number of ways including, by way of example, by softkeys (not shown), by dedicated examination mode control keys (not shown), by activating individual or combined ones of the input controls 294, etc. Exemplary embodiments of the examination application 172 include means of indicating examination completion (block 212) that cannot be accidentally activated by the examinee, which could have undesirable consequences for the examinee (e.g., potentially failing the examination). In any event, in the illustrated embodiment, the examinee may activate the control 310 to indicate completion of the examination (block 212). Activating the control 310 may provide a confirmation screen (not shown) allowing the examinee to confirm that the examination is complete or, alternatively, to return to the previous screen.

After receiving the indication that the examination is complete (FIG. 4, block 212), or upon expiration of the allotted examination time, the examination application 172 may determine whether the examinee accessed any unauthorized programs or functions and/or may determine whether the examinee viewed or launched any applications—and which applications—while in examination mode (FIG. 4, block 214). In some embodiments, making the determination may require checking a log maintained by the examination application 172. In other embodiments, making the determination may require checking one or more flag bits within the program memory 146 or the RAM 150. In still other embodiments, making the determination may require requesting data from the workstation 110 or the server 108 monitoring the "heartbeat" signal from the examination application 172.

In any event, if the examination application 172 determines (FIG. 4, block 214) that the examinee viewed or launched another application, accessed a prohibited application or function, or otherwise did something that the examination application 172 (or the server 108 or the workstation 110) was programmed to monitor, the examination application 172 may display a "fail" indication (FIG. 4, block 216). Otherwise, the examination application 172 may compute a hash output (FIG. 4, block 218) and present the computed hash output on the display 156 of the mobile device 102 (FIG. 4, block 220). Of course, the blocks 202-220 of the described method 200 need not necessarily occur in the exact order described in the paragraphs above. For example, the computation of the hash output (block 220) may occur (in the examination application 172, the server 108, or the workstation 110) any time after the examination application 172 receives the hash input (block 206), and the hash output may be stored the program memory 130, the program memory 146, the RAM 136, or the RAM 150. The hash output may be computed by the examination application 172 using the microprocessor 150 of the mobile device 102. Alternatively, examination application 172 may transmit the hash input to the server 108 or the workstation 110 which may compute the hash output using the microprocessor 132. As yet another alternative, the server 108 or the workstation 110 may use a pre-determined hash input and transmit to each of the mobile devices 102 a hash output for presentation on the display 156 of the mobile device 102.

In some embodiments implementing the server 108 and/or the workstation 110, the examination application 172 may, in addition to or instead of displaying the fail indicator (FIG. 4, block 216) and/or displaying of the visual hash 314 (FIG. 4, block 220), report directly to the server 108 or the workstation 110 that an examinee did or did not view or launch any prohibited applications or functions, or the server 108 or the workstation 110 may monitor the examination application 172 directly, via the heartbeat signal. The server 108 and/or the workstation 110 may notify the proctor and/or the examinee that the exam was (or was not) successfully completed. The notification may take the form of a message presented on the display of the 114 of the server 108 or the workstation 110, a message presented on the display of the mobile device 102 via the examination application 172, an SMS message transmitted to the mobile device 102, an e-mail message transmitted to one or both of the proctor and the examinee, etc. The hash output may, in some implementations be used to authenticate or encode transmissions between the server 108, the workstation 110, and/or the mobile device 102.

Figure 10A:
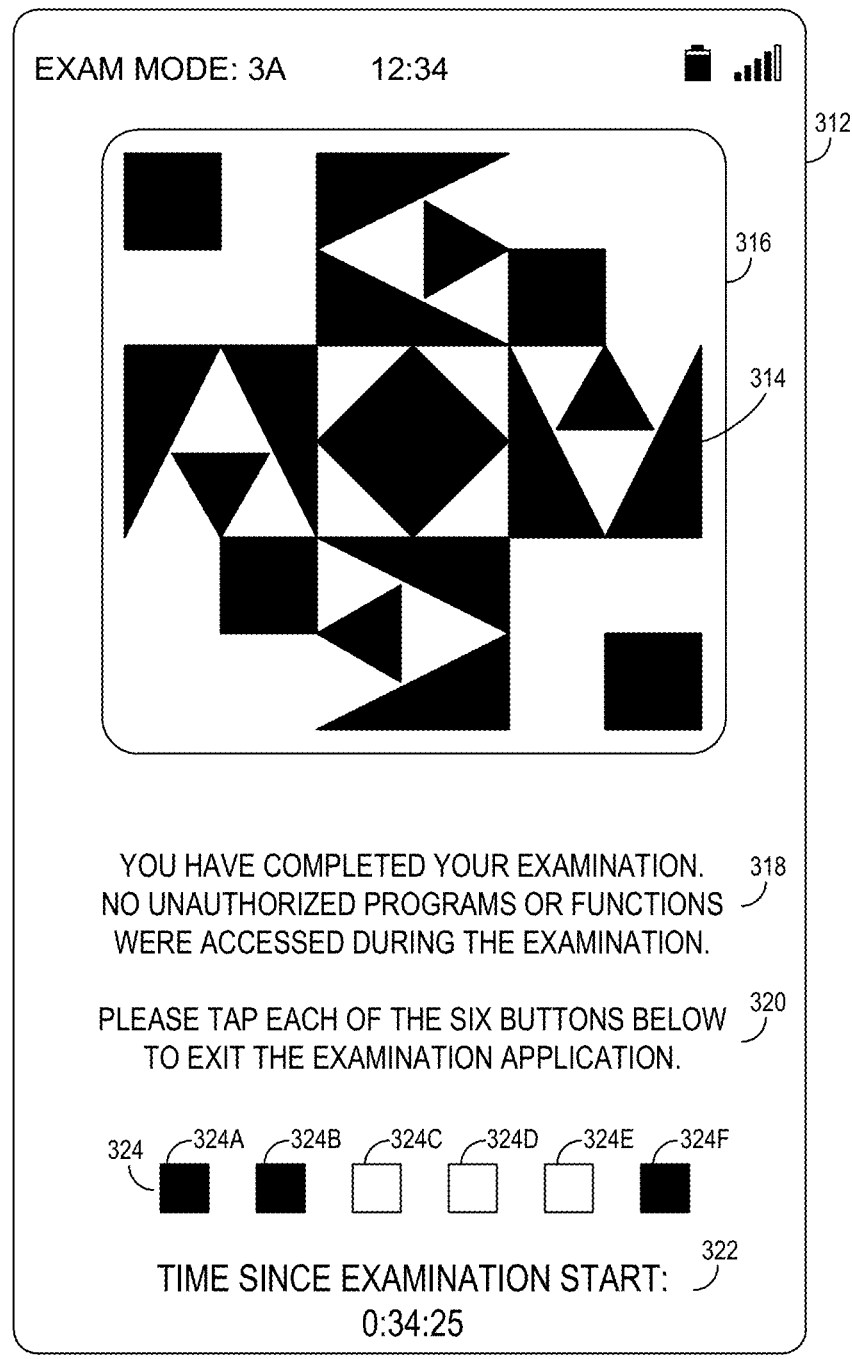
FIG. 10A illustrates a first embodiment of an examination completion screen displayed in accordance with presently described embodiments.

FIG. 10A depicts an exemplary embodiment of an examination completion screen 312 of the examination application 172. The examination completion screen 312 presents the hash output as a visual hash 314, which may also be referred to as a success icon, in a visual hash presentation area 316.

In some embodiments, the examination completion screen also includes an indication 322 of the time elapsed since the examination started, the time remaining in the examination period, the start and completion times for the examinee, and/or the start time of the examination and the current time. The examination completion screen 312 may also include a message 318 and/or instructions 320 related to operating a control 324 to exit the examination mode. While the examination completion screen 312 illustrated in FIG. 10A depicts the control 324 as six controls 324A-324F, all of which must be activated to exit the examination mode, the control 324 may be any control operable to prevent accidental or careless premature exit from the examination completion screen 312. In some contemplated embodiments, the examination application 172 may exit the examination mode after receipt of the completion input, having transmitted information indicating success or failure to the server 108 and/or the workstation 110. In other embodiments, the server 108 and/or the workstation 110 may cause the examination application 172 to exit the examination mode upon activation of a control on the server 108 or the workstation 110, or upon receipt of the completion indication or the information indicating success or failure.

Figure 10B:
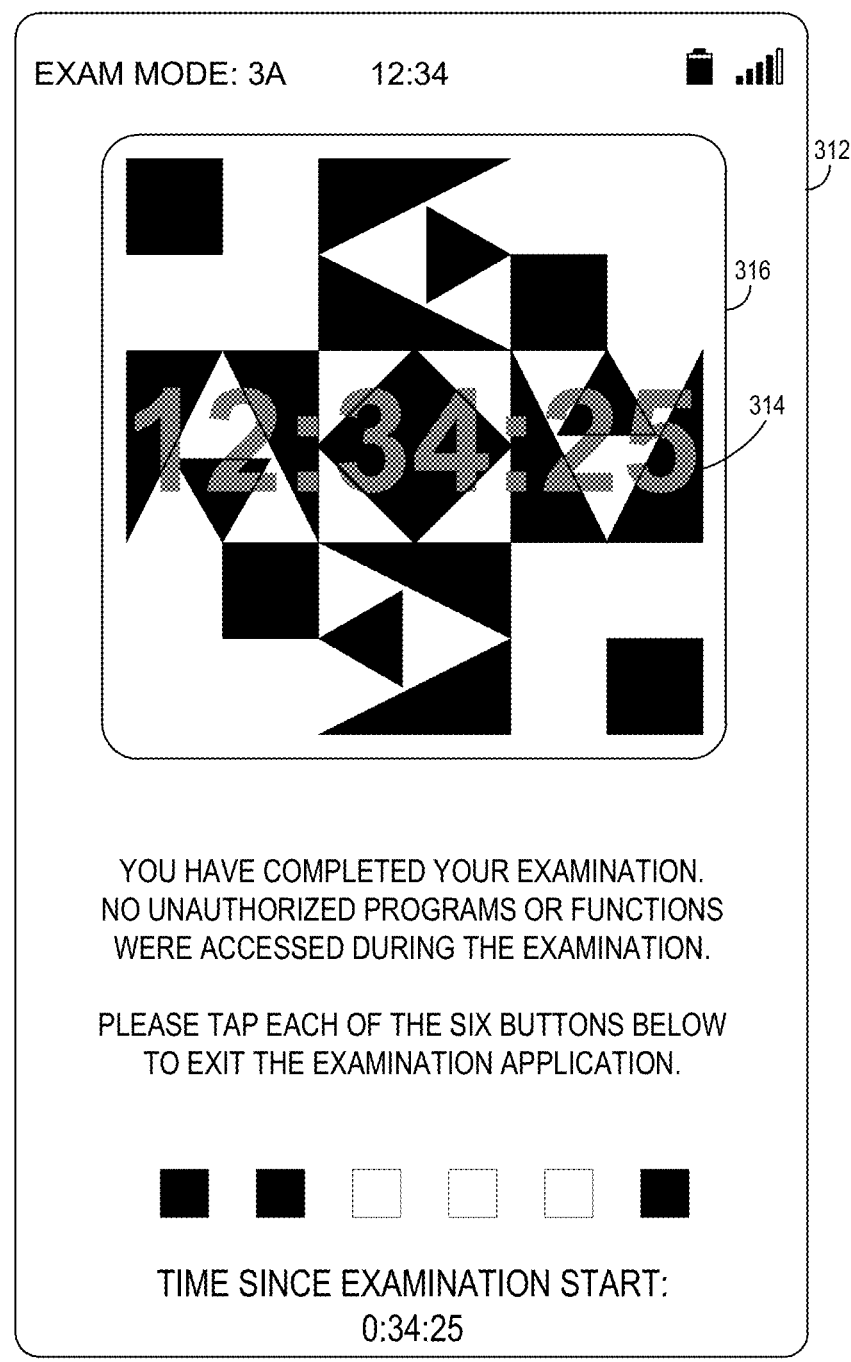
FIG. 10B illustrates a second embodiment of an examination completion screen displayed in accordance with presently described embodiments.

Referring now to FIG. 10B, in some embodiments, the success icon 314 presented on the examination completion screen 312 may have superimposed on it a time value 326. To provide additional security, the time value 326 may be a changing value such as the time elapsed since the examination started or the current time and, further, may be affected by the visual hash on which it is superimposed, so that the image presented in the visual hash presentation area 316 (i.e., the success icon 314 with the superimposed time value 326) and, in particular, the font of the time value 326 changes with time, while the visual hash 314 stays the same. In another embodiment, the time value 326 may be static, i.e., it does not change. In this embodiment, the time value 326 may provide an indication of when the examination mode was exited. This may be useful to facilitate detecting a user that exits the examination mode early in order to access restricted applications, for example.

The examination completion screen 312 may be used in several different manners, depending on the specific embodiment of the examination application 172, the system in which it operates, or the particular scenario of its use. In one embodiment of the examination application 172, the test administrator or proctor may determine a password for the examination, which is entered by each examinee into the information entry screen 230. Upon completion of the examination, each examinee may show the proctor the examination completion screen 312 when handing in the examination. The examination application 172 for each examinee that has successfully completed the examination will present the same success icon 314, which the proctor may recognize by having previously entered it into the examination application 172, or by having used a verification program to determine ahead of time what the success icon 314 will look like. Alternatively, the proctor may not have pre-existing knowledge of what the success icon 314 will look like, but rather merely looks for a group of the same images on several different mobile devices and assumes this is the success icon. As another alternative, the proctor may utilize a mobile device with the examination application 172 to generate his/her own success icon 314 in order to determine what the success icon 314 should look like.

In other embodiments, the examination application 172 may present a different success icon 314 to each examinee upon successful completion of the examination. In embodiments, for example, in which the hash input is specific to each examinee (e.g., the hash input includes all or a portion of an examinee ID), or to groups of examinees (e.g., the hash input includes one of several test booklet numbers), the proctor may have a list of pre-determined success icons 314 for each of the examinees. Likewise, in embodiments in which the examinee pre-registers the mobile device 102 with the system 100 (e.g., with the server 108), the proctor may also have a list of pre-determined success icons 314 for each of the examinees. Still further, in some embodiments in which the mobile devices 102 are connected to the server 108 or the workstation 110, the mobile devices 102 may transmit the hash input information to the server 108 or the workstation 110 upon receiving the hash input (FIG. 4, block 206), and the server 108 or the workstation 110 may determine the hash output and visual hash 314 for the received hash input. In still other embodiments in which the server 108 or the workstation 110 transmits to each of the mobile devices 102 a hash input, the server 108 or the workstation 110 may also display a list of success icons 314 for the examinees (if each hash input is different) or may display a single success icon 314 for the examinees (if all examinees enter the same hash input).

Figure 11:
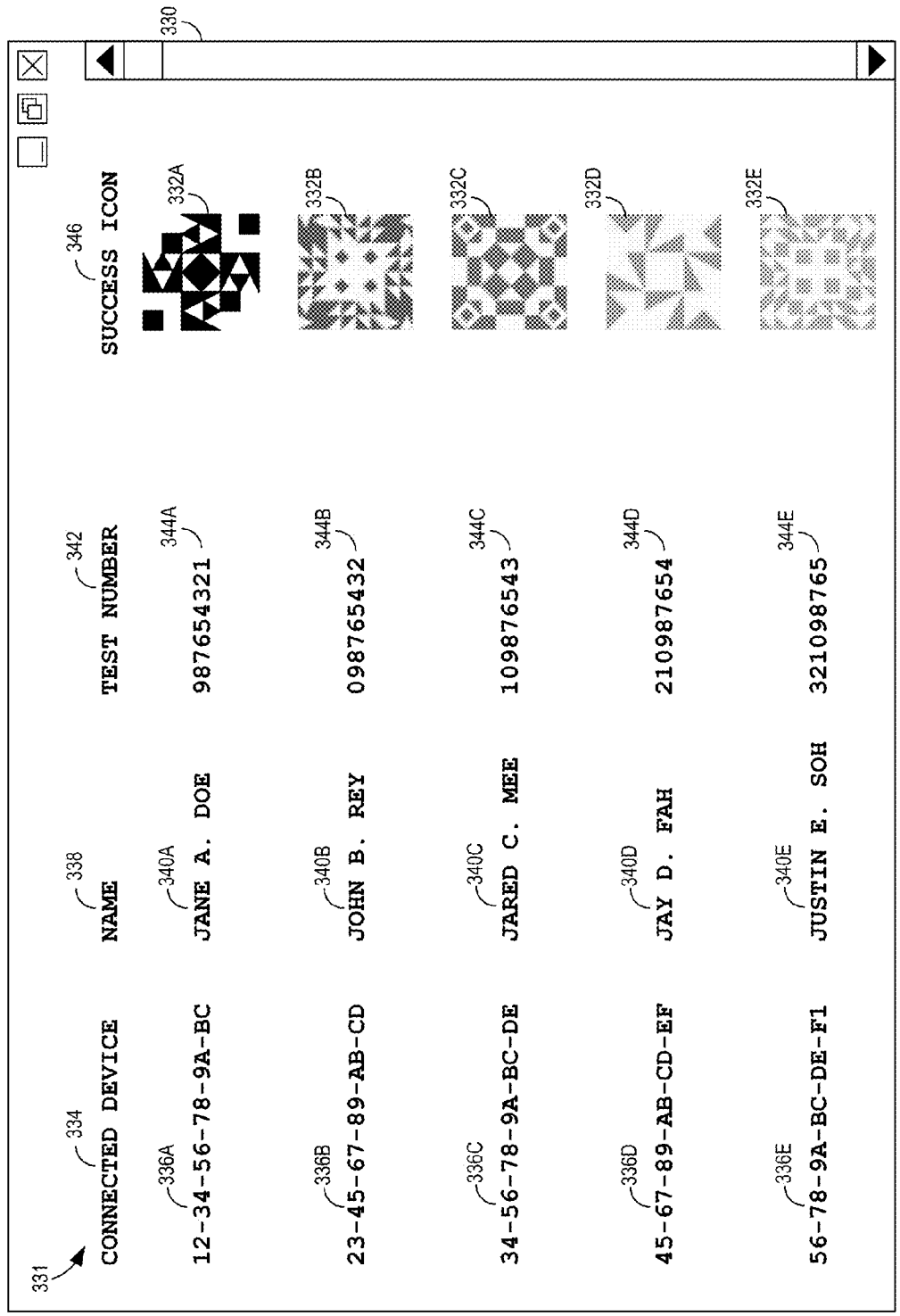
FIG. 11 illustrates a first exemplary proctor screen that may be presented on the workstation or server of FIG. 1.

In any event, in embodiments employing the workstation 110 and/or the server 108, the system 100 may include an application to allow the proctor of the examination to view the hash output for each of the examinees. FIG. 11 depicts an exemplary display 330 that may be presented to a proctor on the display 114 of the server 108 or the workstation 110 in embodiments of the system 100 in which examinees have unique success icons 314. The display 330 presents a list 331 including a column 334 of connected devices each identified by a connected device identifier 336A-E (e.g., a MAC address, a telephone, etc.). A second column 338 lists an examinee name 340A-E corresponding to the connected device 336A-E. A third column 342 lists a test number (i.e., an examination booklet number) 344A-E corresponding to each examinee. In a fifth column 346, a success icon 332A-E is illustrated for each of the examinees. As an example, the display 330 may be employed for embodiments in which the input hash for each examinee is the connected device identifier 336A-F, the test number 344A-344E, the examinee name 340A-340E, or some combination of those values and/or other values. Of course, the display 330 may include less, more, and/or other information than that depicted in FIG. 11.

Figure 12:
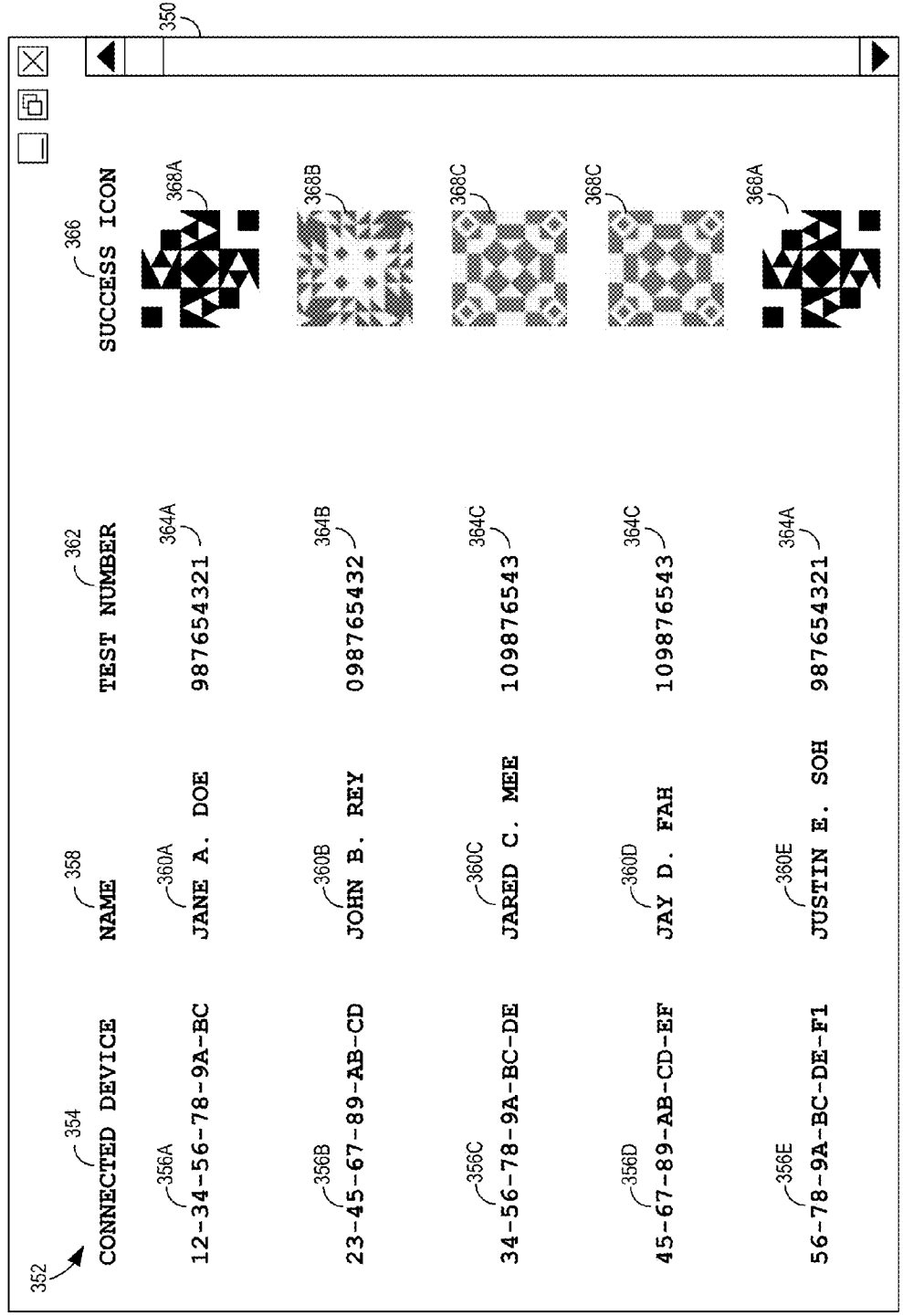
FIG. 12 illustrates a second exemplary proctor screen that may be presented on the workstation or server of FIG. 1.

FIG. 12 depicts an exemplary display 350 that may be presented to a proctor on the display 114 of the server 108 or the workstation 110 in embodiments of the system 100 in which examinees have one of several success icons 314. The display 350 presents a list 352 including a column 354 of connected devices each identified by a connected device identifier 356A-E. A second column 358 lists an examinee name 360A-E corresponding to the connected device 356A-E. A third column 362 lists a test number (i.e., an examination booklet number) 364A-E corresponding to each examinee. Specifically, two examinees 360A and 360C share identical test numbers (364A and 364C) with examinees 360E and 360D, respectively. In a fifth column 366, success icons 368A-C are illustrated for each of the examinees, and examinees 360A, 360E and 360C, 360D sharing the same test numbers 364A and 364C, respectively, also share the same success icons 368A, 368C. The display 350 may be employed for embodiments in which the input hash for each examinee is the test number 344A-344E, the examinee name 364A-364C. Of course, like the display 330, the display 350 may include less, more, and/or other information than that depicted in FIG. 12.

Figure 13:
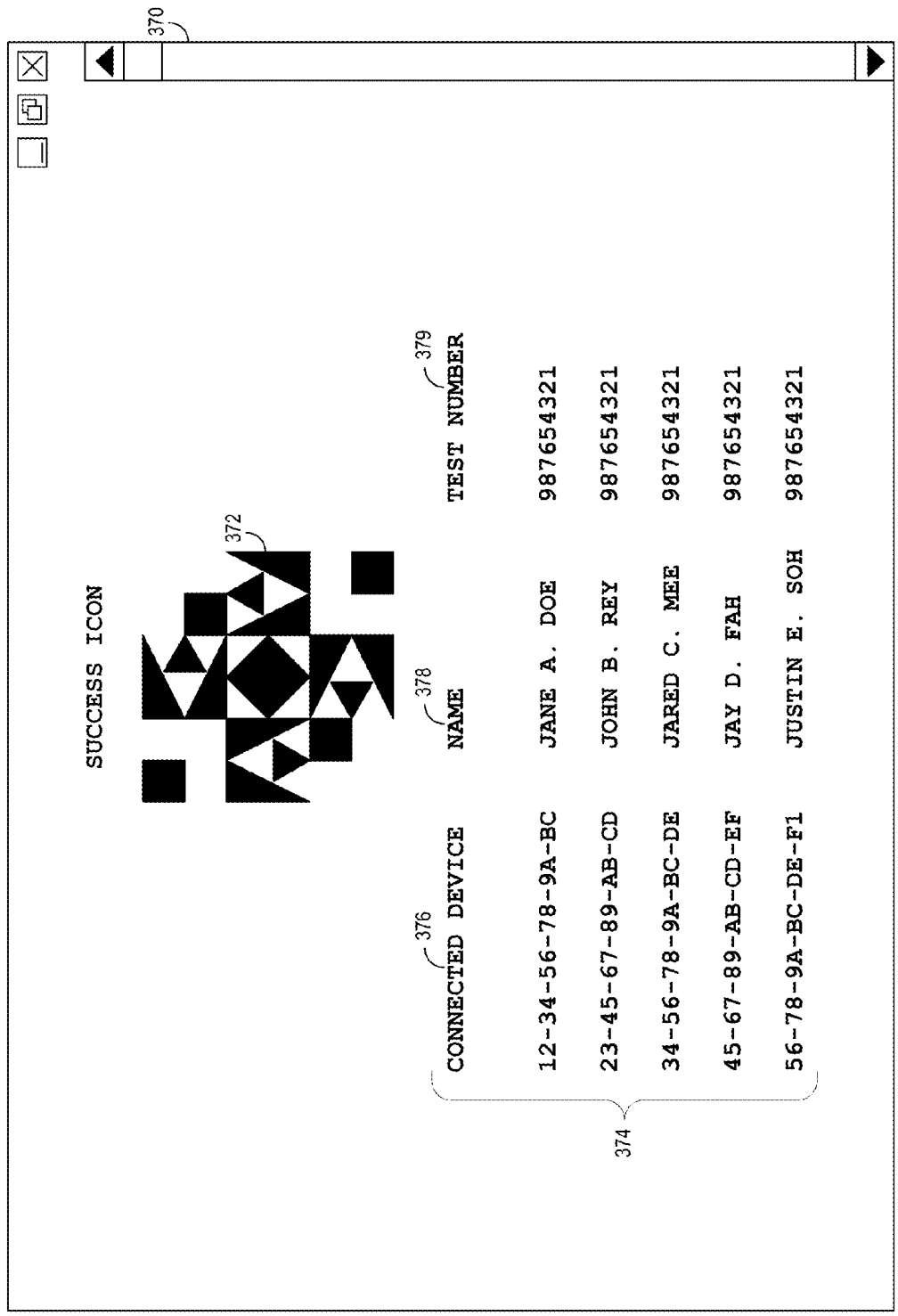
FIG. 13 illustrates a third exemplary proctor screen that may be presented on the workstation or server of FIG. 1.
Figure 14:
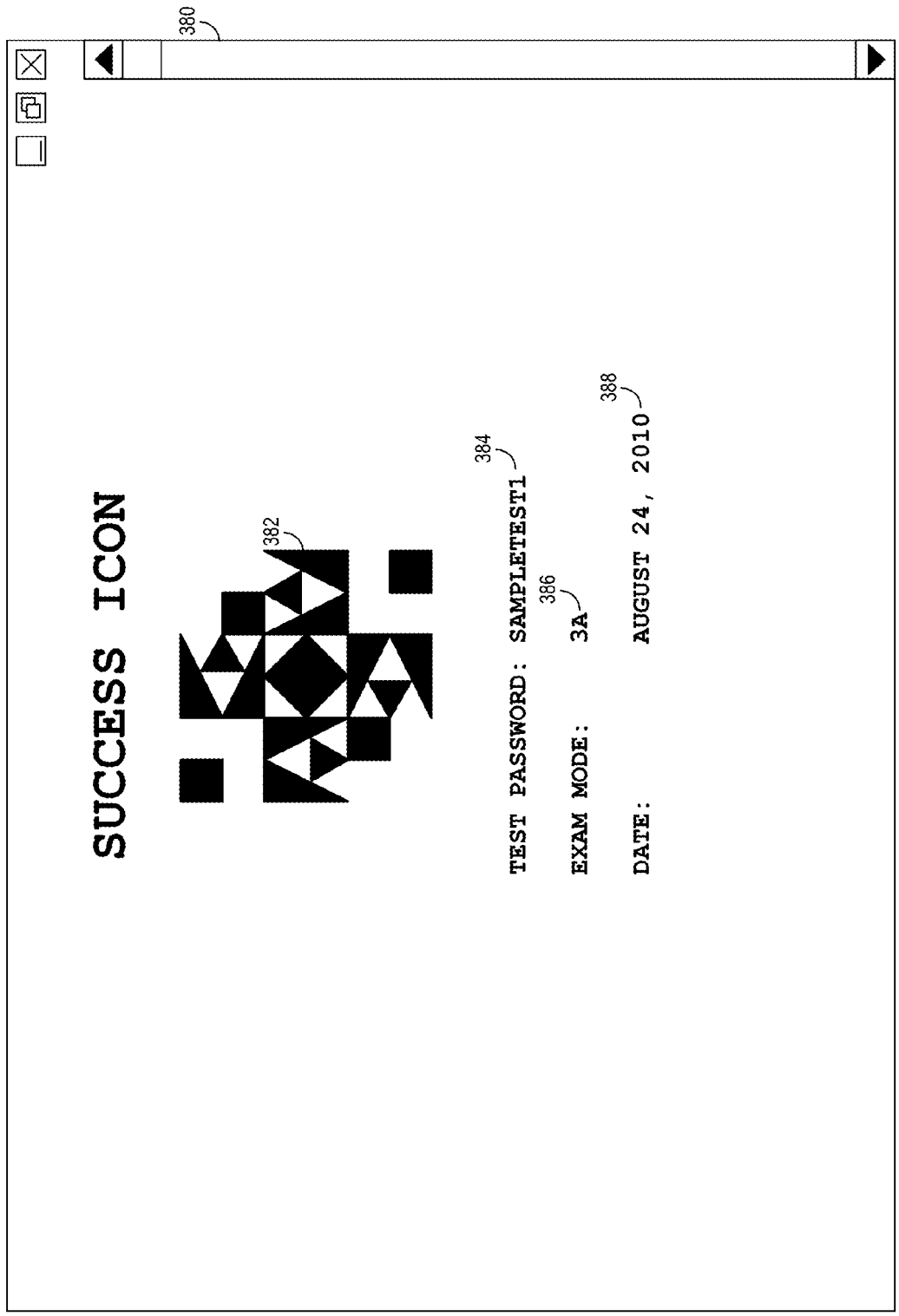
FIG. 14. illustrates a fourth exemplary proctor screen that may be presented on the workstation or server of FIG. 1.

Referring now to FIG. 13, an exemplary display 370 is depicted. The display 370 may be implemented in embodiments in which each examinee enters the same hash input and, therefore, receives the same success icon 314 upon successful completion of the examination. The display 370 shows a success icon 372 as well as examinee information 374, which may include any combination of desired information, depending on the embodiment. By way of example, the information 374 in the display 370 includes a column 376 of connected device identifiers, a column 378 of examinee names, and a column 379 of test numbers.

FIG. 13 depicts another embodiment in which the hash input is the same for each examinee and, therefore, each examinee receives the same success icon 314 upon successful completion of the exam. An exemplary display 380 is depicted. The display 380 shows a success icon 382 as well as a test password 384 used as the hash input, an examination mode 386, and a date 388, some or all of which may be used as the hash input.

While the paragraphs above describe embodiments of the examination application 172 in terms of an application that may implement certain secondary functionality (e.g., various types of calculators, a word processor, etc.), it is explicitly contemplated that the examination application 172 may, in some embodiments, be implemented as a secondary feature of a primary application. As but one example, a graphing calculator application may implement the features of the examination application 172.

It is also contemplated that the examination application 172 may, in some embodiments, operate as an auxiliary program, monitoring the use of other applications—which applications may or may not be designed specifically for interoperability with the examination application 172—allowed and/or prohibited by the examination application. For example, the examination application 172 may record which applications on the mobile device 172 are executed while in examination mode, ignoring use of allowed applications, and noting the use of prohibited applications. Alternatively or in addition, the examination application could disable execution of one or more applications in part or in its entirety. For example, in some embodiments, one or more examination modes may disable messaging and telephone applications, or may suppress notifications (e.g., message alerts, incoming call alerts, etc.) from the applications.

Further, it is contemplated that the examination application 172 may have a "normal" mode, in addition to the examination mode, in which the examination application 172 (or the calculator, word processor, etc.) operates outside of the restrictions of the examination mode. Further still, exiting the examination mode, as described above with reference to FIGS. 10A and 10B, may return the examination application (or the calculator, word processor, etc.) to the normal mode.

While this specification describes the present inventions with reference to specific examples, which are intended to be illustrative only and not to be limiting of the inventions, changes, additions, and/or deletions may be made to the disclosed embodiments without departing from the scope of the inventions. The specification does not describe every possible embodiment, as describing every possible embodiment would be impractical, if not impossible. One could implement numerous alternate embodiments, using either current technology or technology developed after the filing date of this application.

We claim:

1. A system for coordinating the secure use of computer devices during an academic examination, the system comprising:

a plurality of computer devices, each computer device comprising (i) a memory device storing (a) at least one approved application, (b) at least one un-approved application, and (c) a testing routine, and (ii) a processor coupled to the memory device and programmed to execute each of the at least one approved application, the at least one un-approved application, and the testing routine, wherein execution of the testing routine:

causes the processor to allow a respective user to access and use the at least one approved application and restricts or prevents access by the user of the at least one un-approved application, determines whether the respective user of the respective computer device accessed any un-approved applications using the computer device while the computer device was executing the testing routine, and receives identification information corresponding to the respective computer device and uses the identification information as an input to a hash function to generate a user hash output; and a proctor computer comprising a memory device storing (i) a routine for receiving identification information corresponding to one of the plurality of computer devices, and (ii) a verification routine for providing one or more indications of whether one or more users of one or more of the plurality of computer devices accessed any of the at least one un-approved application while the one or more computer devices were executing the testing routine, wherein execution of the verification routine includes:

using identification information corresponding to one of the computer devices as an input to the hash function to generate a proctor hash output for the one computer device, such that the user hash output and the proctor hash output are the same if the user of the one computer device has not accessed any of the un-approved applications, and causing a visual indication of the hash output to be displayed on a display device.

2. The system of claim 1, wherein:

the testing routine generates the user hash output and represents the user hash output as an icon or symbol; and the verification routine generates the proctor hash output and represents the proctor hash output as an icon or symbol, and the icon or symbol representing the proctor hash output is the same as the icon or symbol representing the user hash output when the user of the one of the plurality of computer devices has not accessed any of the un-approved applications.

3. The system of claim 1, wherein the identification information includes at least the indication of a corresponding user or an indication of the academic examination.

4. The system of claim 1, wherein the identification information comprises at least one of the group consisting of:

an ID number;

an examination seat; and a name.

5. The system of claim 1, wherein the identification information comprises at least an examination number.

6. The system of claim 1, wherein the respective memory device of each of the plurality of computer devices further stores a routine for receiving configuration information for the testing routine, the configuration information causing the testing routine to recognize at least one application on the device as an un-approved application.

7. The system of claim 6, wherein the configuration information specifies an approved application and causes the testing routine to recognize all other applications as un-approved applications.

8. The system of claim 1, wherein the memory device of the proctor computer further stores a routine for configuring each of the plurality of computer devices to recognize at least one approved application and at least one un-approved application.

9. The system of claim 1, wherein the proctor computer and/or the plurality of computer devices is/are configured to receive the identification information by scanning or imaging a bar code.

10. The system of claim 1, wherein the testing routine is configured to evaluate whether an un-approved application is accessed by monitoring for a signal sent to the testing routine from the operating system of the respective computer device.

11. The system of claim 1, wherein the testing routine is configured to establish a communication connection with the proctor computer; and transmit to the proctor computer a verification copy of the computed hash output.

12. The system of claim 1, wherein the testing routine is a subroutine of a calculator application, and the calculator application is the approved application.

13. A non-transitory computer-readable storage medium having stored thereon a set of instructions, executable by a processor, for coordinating the secure use of a plurality of computer devices during an academic examination, wherein each computer device is configured to i) allow a respective user to access and use at least one approved application, ii) restrict or prevents access by the user of at least one un-approved application, iii) determine whether the respective user of the respective computer device accessed any un-approved applications using the computer device while the computer device was in a test mode, and iv) use respective identification information corresponding to the respective computer device as an input to a hash function to generate a respective user hash output, the instructions comprising:

instructions for receiving information generated by a respective routine executing on each of the plurality of computer devices, the received information including respective identification information corresponding to the respective computer device;

instructions for determining, using the received information, whether respective users of the plurality of computer devices accessed one or more un-approved applications using the plurality of computer devices while the plurality of computer devices were in the test mode; and instructions for generating, for each of the plurality of computer devices, a respective indication of whether a corresponding user of the respective computer device accessed one or more un-approved applications while the respective computer device was in the test mode;

instructions for calculating, for each computer device, a proctor hash output from a hash input using a hash function, the hash input including at least the received identification information, such that the proctor hash output and the user hash output are the same if the user of the respective computer device did not access any un-approved applications; and instructions for displaying a visual indication of the proctor hash output on a display device.

14. The computer readable storage medium of claim 13, wherein the information includes at least the indication of the corresponding user or an indication of an academic examination that the corresponding user is completing.

15. The computer readable storage medium of claim 13, wherein the information includes at least the indication of the corresponding user and wherein the instructions stored on the computer readable storage medium further comprise instructions for displaying, on the display device, a list of the users corresponding to the plurality of computer devices.

16. The computer readable storage medium of claim 13, further comprising instructions for receiving location information from each of the plurality of computer devices.

17. The computer readable storage medium of claim 13, further comprising instructions for transmitting configuration information to each of the plurality of computer devices.

18. The computer readable storage medium of claim 13, further comprising instructions for implementing a web server through which the received information from the plurality of devices, or information derived therefrom, may be transmitted to a second computer device.

* * * * *